(12) United States Patent
Yu

(10) Patent No.: US 8,964,505 B2
(45) Date of Patent: Feb. 24, 2015

(54) DEVICE AND METHOD FOR DETERMINING SEISMIC OFFSET IN MARINE ACQUISITION

(75) Inventor: Ziqin Yu, Massy (FR)

(73) Assignee: CGGVeritas Services SA, Massy Cedex (FR)

(*) Notice: Subject to any disclaimer, the term of this patent is extended or adjusted under 35 U.S.C. 154(b) by 495 days.

(21) Appl. No.: 13/493,378

(22) Filed: Jun. 11, 2012

(65) Prior Publication Data
US 2013/0121107 A1    May 16, 2013

Related U.S. Application Data

(60) Provisional application No. 61/557,978, filed on Nov. 10, 2011.

(51) Int. Cl.
*G01V 1/38*     (2006.01)
*G01V 1/30*     (2006.01)

(52) U.S. Cl.
CPC ............. *G01V 1/302* (2013.01); *G01V 1/3835* (2013.01)
USPC .......................................................... 367/38

(58) Field of Classification Search
USPC .......................................................... 367/38
See application file for complete search history.

(56) References Cited

U.S. PATENT DOCUMENTS

| 6,021,379 | A  | * | 2/2000  | Duren et al. | 702/16 |
| 6,151,275 | A  | * | 11/2000 | Starr        | 367/57 |
| 8,380,440 | B2 | * | 2/2013  | Aarre et al. | 702/17 |
| 2008/0172181 | A1 | * | 7/2008 | Barnes       | 702/16 |
| 2009/0135669 | A1 | * | 5/2009 | Barnes       | 367/21 |
| 2009/0245023 | A1 | * | 10/2009 | Lie         | 367/50 |
| 2009/0299639 | A1 | * | 12/2009 | Aarre et al. | 702/17 |

\* cited by examiner

*Primary Examiner* — Luke Ratcliffe
*Assistant Examiner* — James Hulka
(74) *Attorney, Agent, or Firm* — Patent Portfolio Builders PLLC

(57) ABSTRACT

Computing device and method for generating an image of a subsurface. The method calculates an offset shift of measured offsets between a seismic source and plural receivers of a streamer. The method includes receiving seismic data recorded underwater by the plural receivers; selecting two pairs of traces from the plural traces and for each pair, calculating a quantity Y that depends on measured offsets of receivers for which the traces were selected, and a quantity X that depends on travel-times and the measured offsets of the receivers for which the traces were selected; calculating a linear relation Y=aX+b, where "a" is a constant and "b" is related to the offset shift; estimating the offset shift from "b"; correcting the measured offsets of the receivers based on the offset shift; and calculating the image of the subsurface based on the corrected offsets.

20 Claims, 9 Drawing Sheets

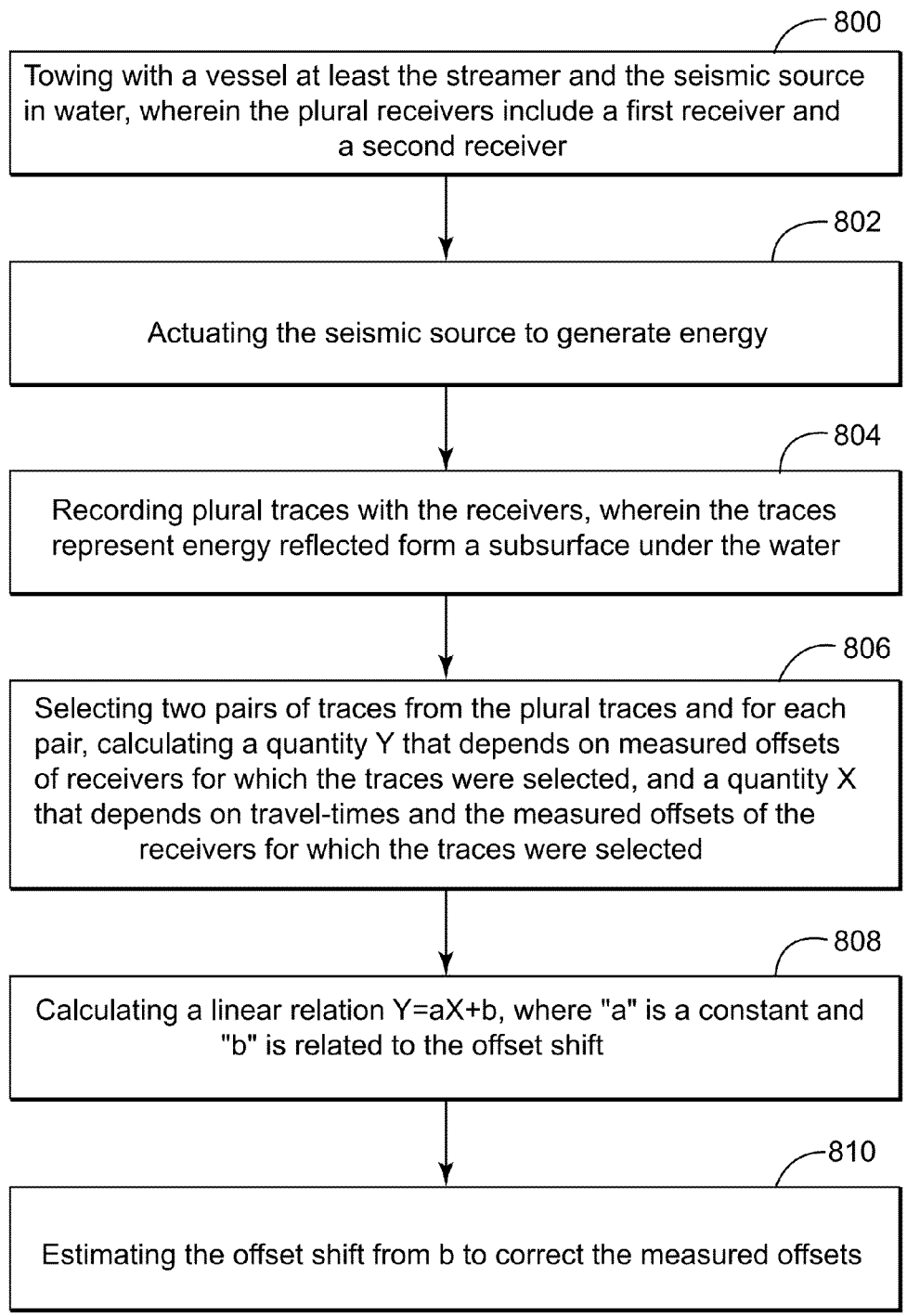

DEVICE AND METHOD FOR DETERMINING SEISMIC OFFSET IN MARINE ACQUISITION

CROSS-REFERENCE TO RELATED APPLICATIONS

The present application is related to and claims the benefit of priority of U.S. Provisional Application Ser. No. 61/557,978, filed on Nov. 10, 2011, having the title "A Statistical Method to Verify the Seismic Offset in Marine Acquisition," and being authored by Ziqin Yu, the entire content of which is incorporated herein by reference.

BACKGROUND

1. Technical Field

Embodiments of the subject matter disclosed herein generally relate to methods and systems and, more particularly, to mechanisms and techniques for determining an offset for marine seismic acquisition while surveying a subsurface.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration for determining the properties of earth's subsurface, which are especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional marine system for generating the seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to a surface 14 of the ocean. The streamers may be disposed to have other spatial arrangements than horizontally. The vessel 10 also tows a seismic source 16 that is configured to generate a seismic wave 18. The seismic wave 18 propagates downward toward the seafloor 20 and penetrates the seafloor until eventually a reflecting structure 22 (reflector) reflects the seismic wave. The reflected seismic wave 24 propagates upward until is detected by the receiver 11 on streamer 12. Based on the data collected by the receiver 11, an image of the subsurface is generated.

In order to obtain an accurate image of the subsurface being surveyed, it is desirable to have accurate information about a distance between the source 16 and each of the receivers 11A and 11B (see FIG. 2). In this way, the recorded data can be accurately matched to the various points of the subsurface. Traditionally, the distance between the source and a receiver (offset herein) is determined as follows. As shown in FIG. 2, the back end 12A of the streamer is attached to a buoy 40 that floats at water surface 14. The buoy 40 may have a GPS device 42 that determines the location of the buoy. The source 16 may include a GPS device 44. The same is true for the vessel 10, i.e., it also includes a GPS device 46. By measuring the position of the source 16 with the GPS 44 and the position of the end of the streamer with the GPS device 42, and by knowing the length of the streamer and the placement of the receivers 11A and 11B along the streamer 12, the position of each receiver relative to the source 16 may be calculated. Moreover, an acoustic positioning network may be used to determine the underwater relative positions of the receivers, thus helping to measure the positions more accurately. It is noted that FIG. 2 shows the subsurface 50 that is being surveyed below the body of water 52.

The four-dimensional (4D) geophysical imaging, which is becoming more desired today, requires a high accuracy of the offset, e.g., below 1 meter. In this regard, it is noted that the length of a streamer is about 10 km and, thus, an offset may have a value between 100 m to 10,000 m. The 4D geophysical imaging involves 3D seismic surveys repeated over a same subsurface at different moments in time to determine changes in the geophysical structures of the subsurface. Thus, as the 3D survey is repeated in time, sometimes after a couple of months or years, it is desirable that the offsets are as close as possible to the offsets in the previous survey over the subsurface.

However, the currently used GPS and acoustic devices have their limitations and, for various surveys (e.g., the 4D surveys), the accuracy of these systems might not be good enough, especially for the baseline survey and early monitoring surveys, which were acquired with less accurate positioning system. Alternatively, there is a need to verify the results provided by the GPS and/or acoustic devices. This verification would be especially helpful during the acquisition.

Accordingly, it would be desirable to provide alternative systems and methods that do not rely on GPS or acoustic devices for determining/verifying the offsets during a marine seismic survey.

SUMMARY

According to one exemplary embodiment, there is a method for calculating an offset shift of measured offsets between a seismic source and plural receivers of a streamer. The method includes towing with a vessel at least the streamer and the seismic source in water, wherein the plural receivers include a first receiver and a second receiver; actuating the seismic source to generate energy; recording plural traces with the receivers, wherein the traces represent energy reflected from a subsurface under the water; selecting two pairs of traces from the plural traces and for each pair, calculating a quantity Y that depends on measured offsets of receivers for which the traces were selected, and a quantity X that depends on travel-times and the measured offsets of the receivers for which the traces were selected; calculating a linear relation Y=aX+b, where "a" is a constant and "b" is related to the offset shift; and estimating the offset shift from b to correct the measured offsets.

According to another exemplary embodiment, there is a method for generating an image of a subsurface that calculates an offset shift of measured offsets between a seismic source and plural receivers of a streamer. The method includes receiving seismic data recorded underwater by the plural receivers; selecting two pairs of traces from the plural traces and for each pair, calculating a quantity Y that depends on measured offsets of receivers for which the traces were selected, and a quantity X that depends on travel-times and the measured offsets of the receivers for which the traces were selected; calculating a linear relation Y=aX+b, where "a" is a constant and "b" is related to the offset shift; estimating the offset shift from "b"; correcting the measured offsets of the receivers based on the offset shift; and calculating the image of the subsurface based on the corrected offsets.

According to still another exemplary embodiment, there is a computing device for calculating an offset shift of measured offsets between a seismic source and plural receivers of a streamer. The computing device includes an interface configured to receive plural traces recorded by the receivers, wherein the traces represent energy reflected from a subsurface under the water; and a processor connected to the interface. The processor is configured to, select two pairs of traces from the plural traces and for each pair, calculate a quantity Y that depends on measured offsets of receivers for which the traces were selected, and a quantity X that depends on travel-times and the measured offsets of the receivers for which the traces were selected, calculate a linear relation Y=aX+b, where "a" is a constant and "b" is related to the offset shift, and estimate the offset shift from b to correct the measured offsets.

According to still another exemplary embodiment, there is a non-transitory computer medium for storing instructions for generating an image of a subsurface based on a calculated offset shift of measured offsets between a seismic source and plural receivers of a streamer. The instructions follow the methods discussed above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8 is a flowchart of a method for calculating an offset shift based on common-depth-point-related data according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a source and a single streamer being towed by a vessel. However, the embodiments to be discussed next are not limited to a streamer, but may be applied to plural streamers towed by the same vessel.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for calculating an offset shift of measured offsets between a seismic source and plural receivers of a streamer. The method includes towing with a vessel at least the streamer and the seismic source in water, actuating the seismic source to generate energy, and recording plural traces with the receivers. The method further includes selecting two pairs of traces from the plural traces and, for each pair, calculating a quantity Y that depends on measured offsets of receivers for which the traces were selected, and a quantity X that depends on travel-times and the measured offsets of the receivers for which the traces were selected. The method further includes calculating a linear relation Y=aX+b, where "a" is a constant and "b" is related to the offset shift, and estimating the offset shift from b to correct the measured offsets.

Figure 1:
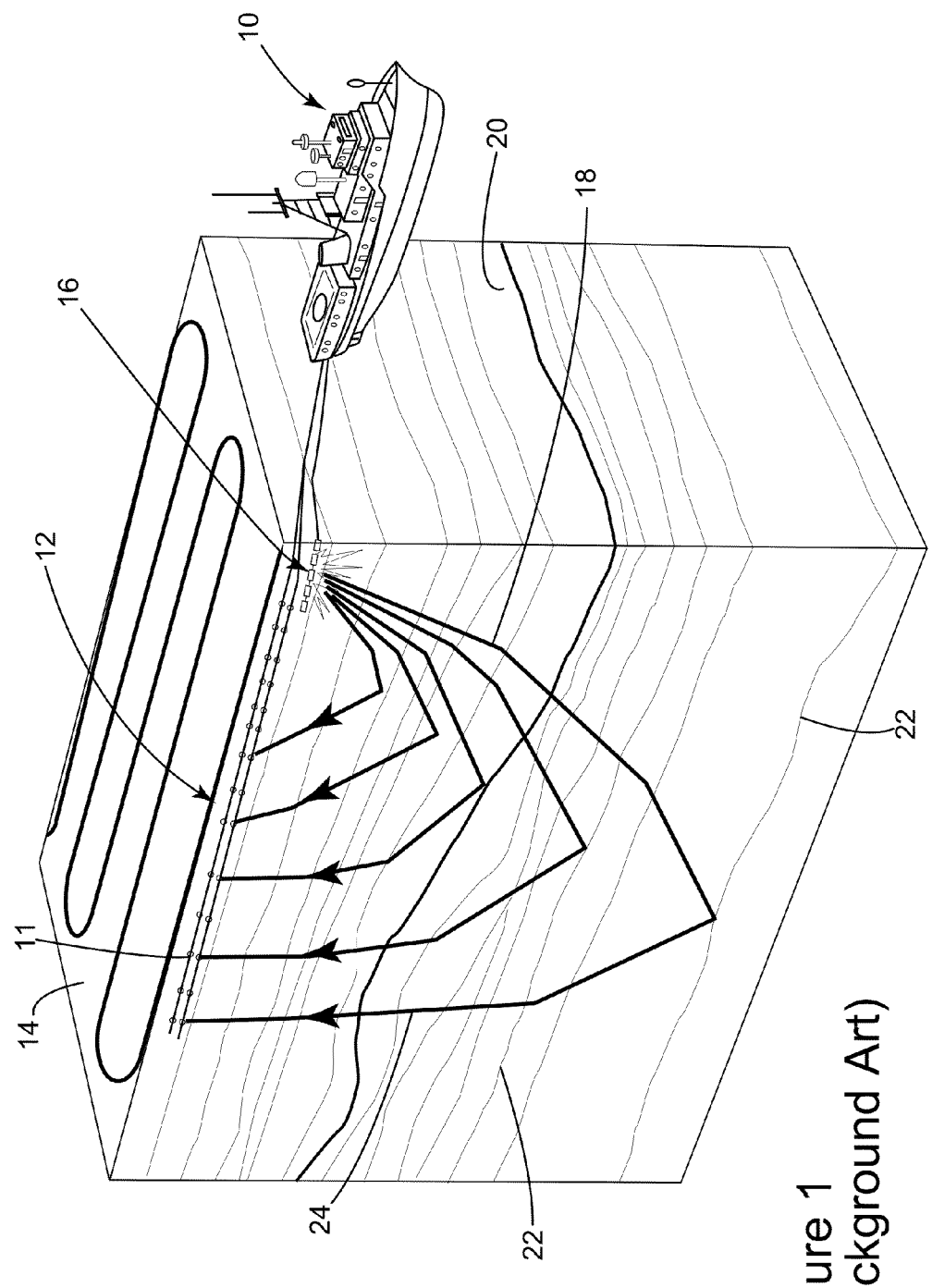
FIG. 1 is a schematic diagram of a conventional seismic survey system.
Figure 2:
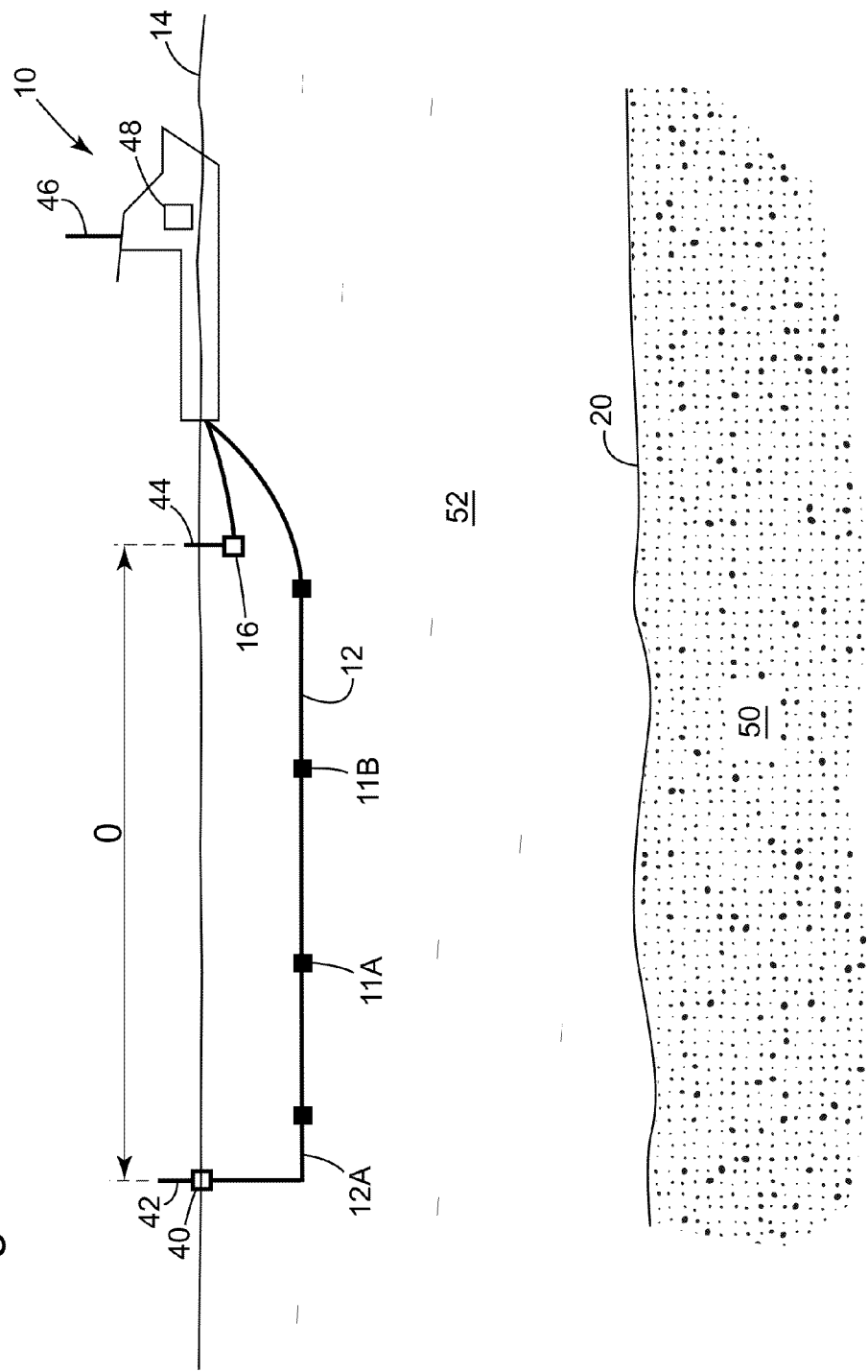
FIG. 2 is a schematic diagram of a marine seismic survey that illustrates an offset.
Figure 3:
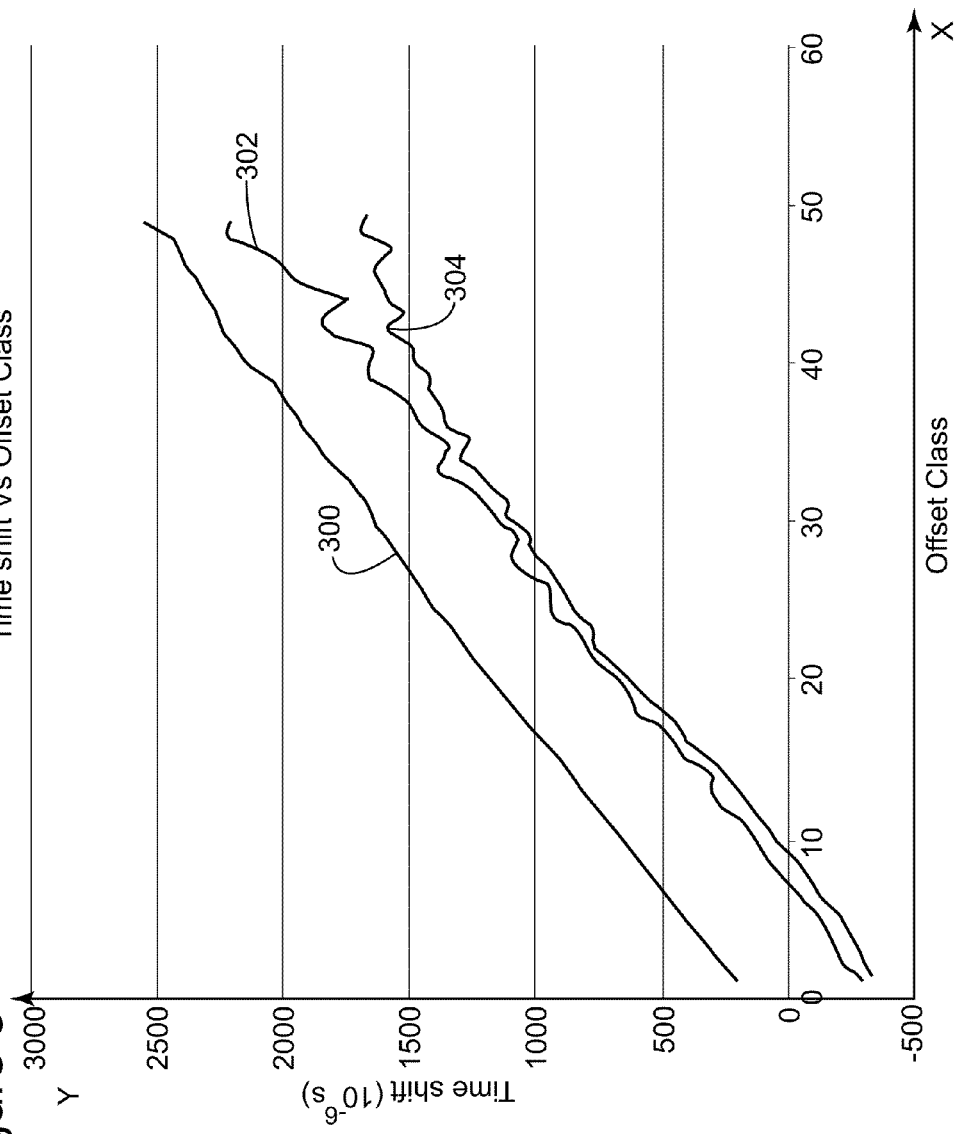
FIG. 3 is a drawing showing time shifts versus offset classes for various surveys.

Prior to discussing the novel method for determining/verifying the offset, an alternative, indirect method is discussed. For 4D seismic surveys, it is possible to plot, as shown in FIG. 3, a time shift versus an offset class for two vintages (two 3D seismic surveys of the same subsurface). The time shift represents the time difference between (i) a travel-time for a wave recorded by a given receiver in the first 3D seismic survey and (ii) a travel-time for a wave recorded by the same receiver in the second 3D seismic survey. The offset class describes a range of distances within which a given receiver is located (e.g., between 1200 and 1300 m from the source). FIG. 3 shows three plots 300, 302 and 304 for three different 4D seismic surveys that indicate that a time shift increases with the offset class. For these examples, an offset of curve 302 should be increased by 4.5 m. It is noted that for an ideal 4D seismic survey (i.e., no time shifts and no different offsets), the three curves 300, 302, and 304 should be parallel with axis OX. However, this method requires at least two vintages and can only indicate that there is an offset problem, but it cannot indicate which vintage suffers from this problem.

Figure 4:
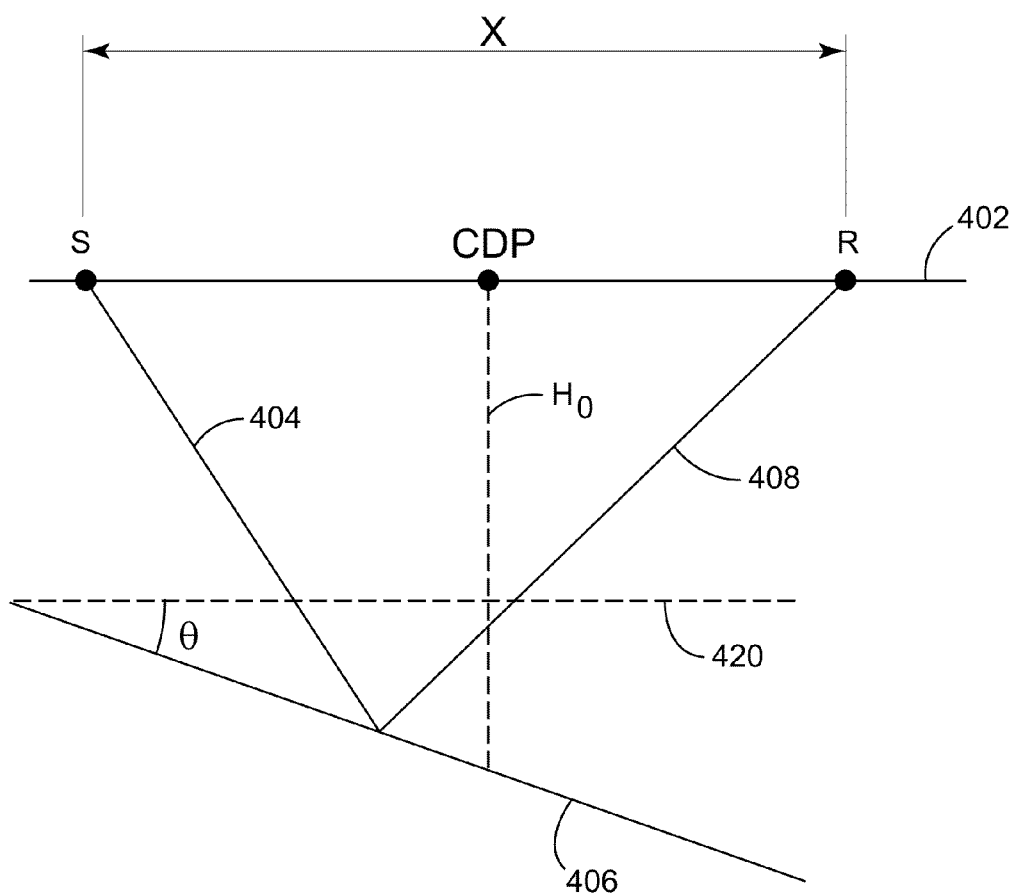
FIG. 4 is a schematic diagram illustrating a common depth point.

Thus, a direct novel method is now introduced which needs a single vintage for determining/verifying the offset. According to an exemplary embodiment illustrated in FIG. 4, a source S and a receiver R are distributed at or close to the water surface 402. The source emits a wave-field 404 toward the water bottom 406 where it is reflected toward the water surface 402. The reflected wave-field 408 is then recorded by the receiver R. A distance between the source S and the receiver R is considered to be the offset x, and the water bottom 406 makes an angle θ (dip) with a line 420 parallel to the water surface 402. The real offset between the source and the receiver R is considered to be the actual offset, and an offset measured by using GPS or acoustic devices is considered to be an effective offset. Thus, in one embodiment, a goal of the method to be discussed next is to determine the offset shift, which is the difference between the actual offset and the measured offset.

A time t necessary for the wave-field to travel from the source S to the water bottom 406 and to the receiver R can be calculated based on the dip moveout (DMO) equation:

$$t^2 = \frac{4H_0^2}{(v_0/\cos\theta)^2} + \frac{x^2}{(v_0/\cos\theta)^2},\quad(1)$$

where $H_0$ is a depth of a common depth point (CDP), i.e., a point on the surface of the water at half distance between the source S and the receiver R. This equation is valid if the water bottom is locally planar, which is the case for this embodiment.

Figure 5:
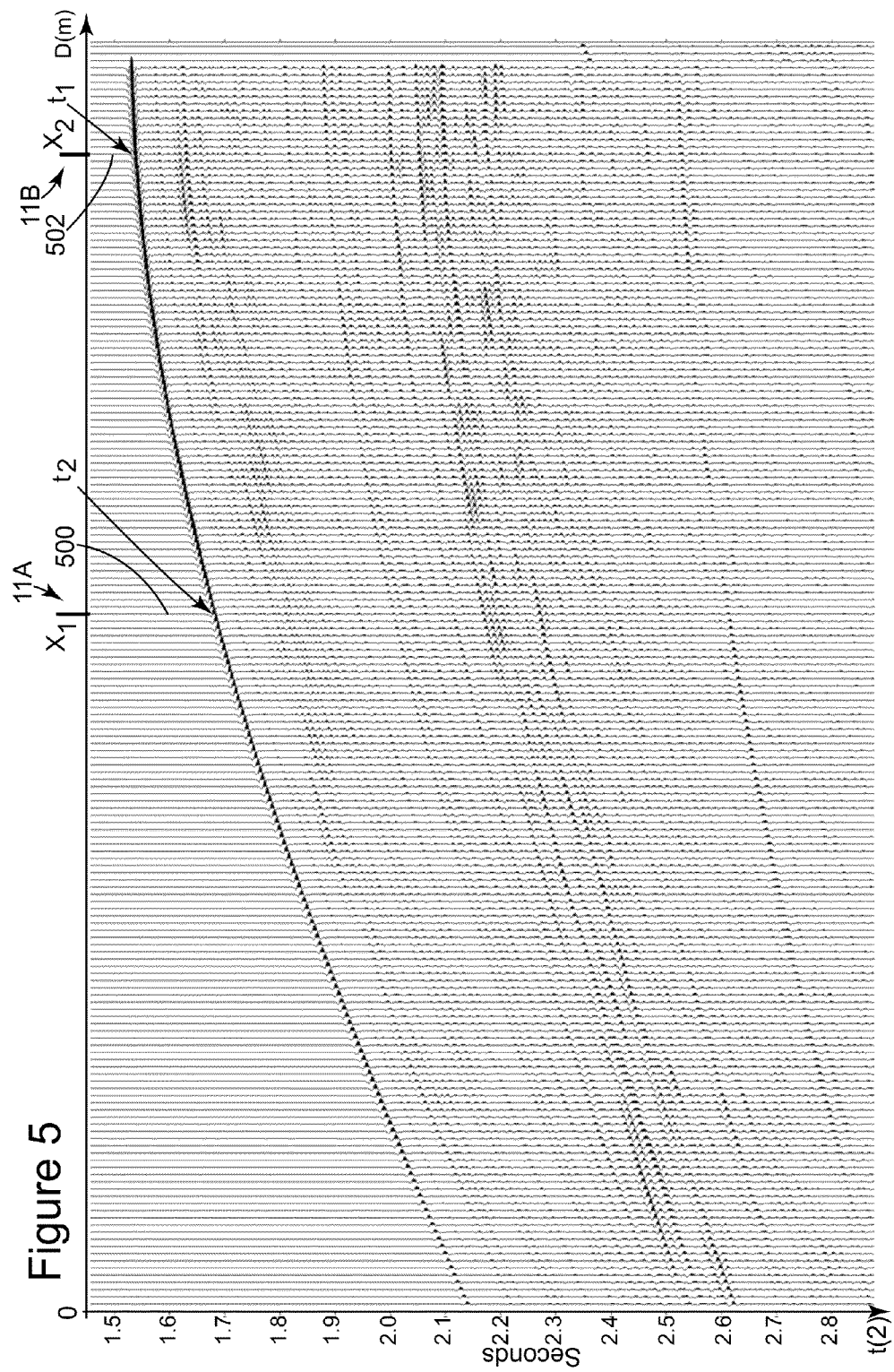
FIG. 5 is a plot of plural traces.

If two traces (a trace is the energy recorded by a receiver from multiple shots) 500 and 502 are selected from the recorded seismic data (corresponding to first and second receivers 11A and 11B) such that their travel-times are $t_1$ and $t_2$, and their corresponding offsets are $x_1$ and $x_2$, as illustrated in FIG. 5, then the difference between the square of their travel-times is:

$$t_2^2 - t_1^2 = \frac{x_2^2 - x_1^2}{(v_0/\cos\theta)^2}.\quad(2)$$

It is noted that a distance between the receivers corresponding to the two traces has a minimum value so that the noise does not impair the accuracy of the method. It is also noted that a first arrival of each trace is selected for calculating the travel-times. For example, the minimum value may be around 1 km. Other values, between hundreds of meters and 3 to 5 km may be possible, depending on the length of the streamer.

Equation (2) may be rewritten as:

$$x_1 + x_2 = (v_0/\cos\theta)^2 \frac{t_2^2 - t_1^2}{x_2 - x_1}.\quad(3)$$

Introducing the notations $Y = x_1 + x_2$ (4) and $$X = \frac{t_2^2 - t_1^2}{x_2 - x_1},\quad(5)$$

equation (3) can be rewritten as follows:

$$Y = aX + b,\quad(6)$$

where b is zero and a is a constant given by $(v_0/\cos\theta)^2$. However, in real-life applications it is observed that b is not zero. For these cases, b equals two times the offset shift dx. This is the case because if the offset is shifted by dx, the measured values are $x_1$ and $x_2$, and thus, the real values are $x_1+dx$ and $x_2+dx$, respectively. For the real value, the DMO equation is satisfied, and then the linear regression should have no term b, i.e., Y=aX. Because Y is the sum of real values of the two offsets, it is equal to $x_1+x_2+2dx$. However, X is unchanged as $v_0$, $\theta$, $t_1$ and $t_2$ are independent of the offset measurement (i.e., they remain unchanged), and $x_2-x_1$ is equal to the difference of the real values (dx cancels out).

Figure 6:
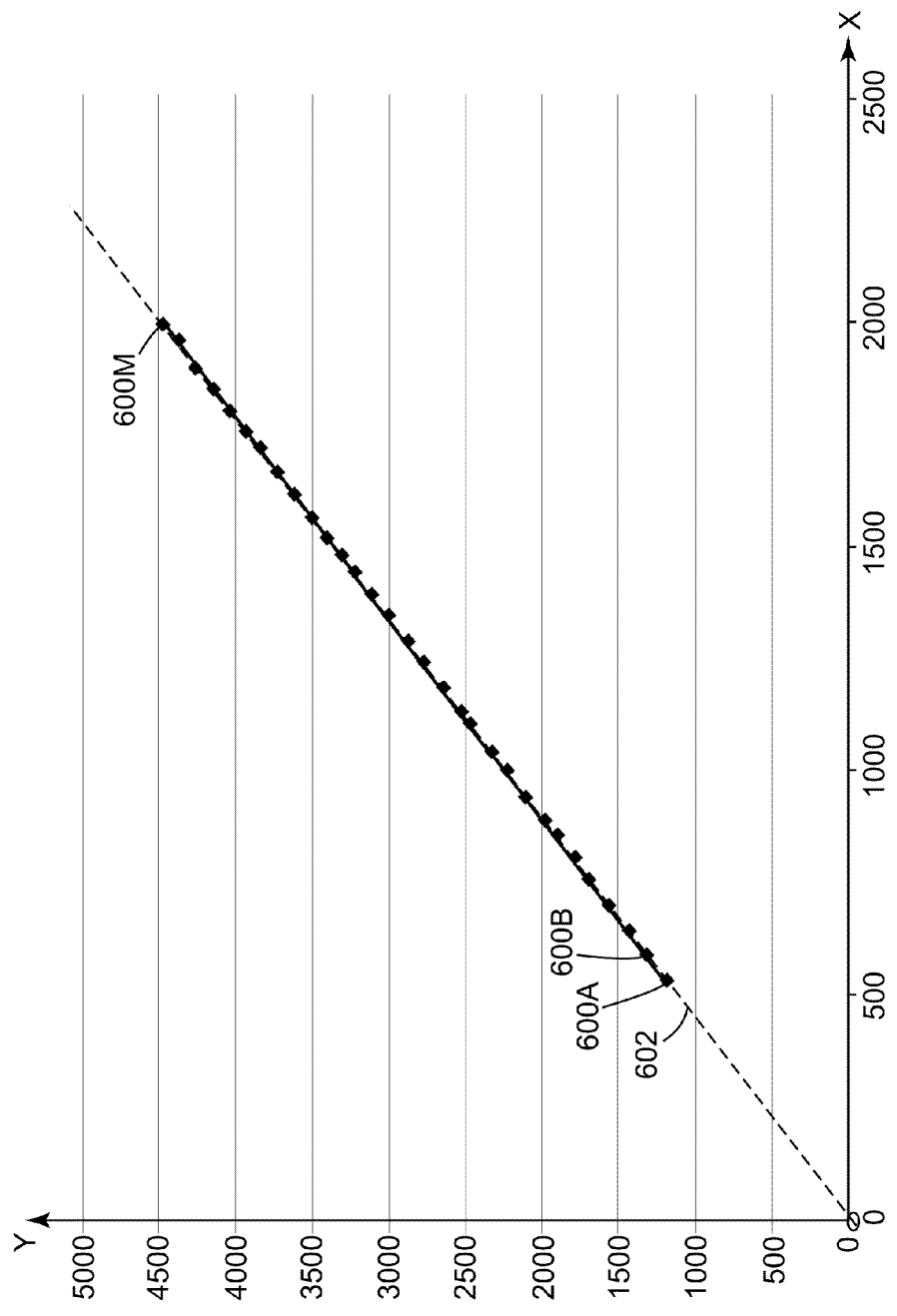
FIG. 6 is a drawing for a common depth point illustrating specific quantities calculated for plural traces associated with the common depth point according to an exemplary embodiment.

To determine the offset shift, multiple pairs of traces (at least two but preferably 20 so that the noise does not affect the accuracy of the method) are selected, and their Y and X values (as defined by equations (4) and (5)) are calculated and then plotted as points 600A-M, as shown in FIG. 6. Using an appropriate mathematical algorithm, e.g., linear regression, a curve 602 is calculated based on the points 600A-M, and the intersection of the curve 602 with axis Y determines parameter "b," which, as noted above, is double the offset shift. It is noted that FIG. 6 does not necessarily indicate that the offset shift is zero, although the figure appears to suggest this (because the scale of the Y and X axis is large).

Figure 7A:
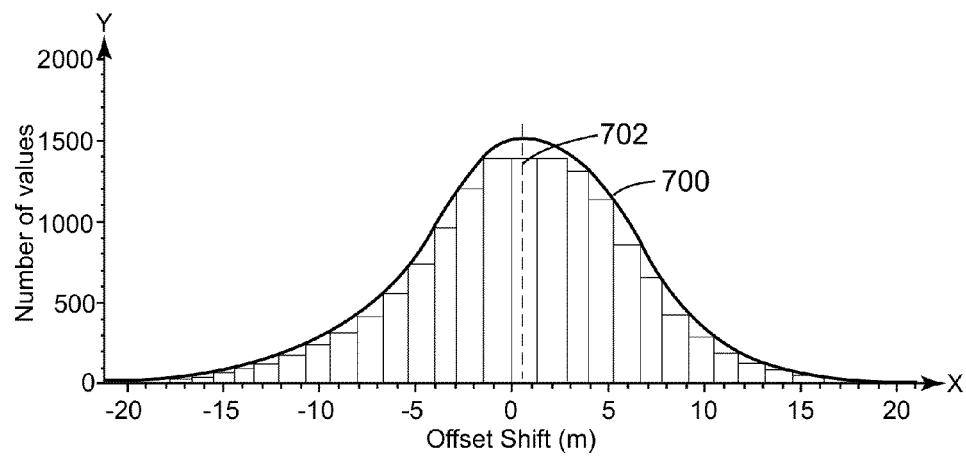
FIGS. 7A and 7B illustrate plural offset shifts corresponding to plural common depth points according to an exemplary embodiment.
Figure 7B:
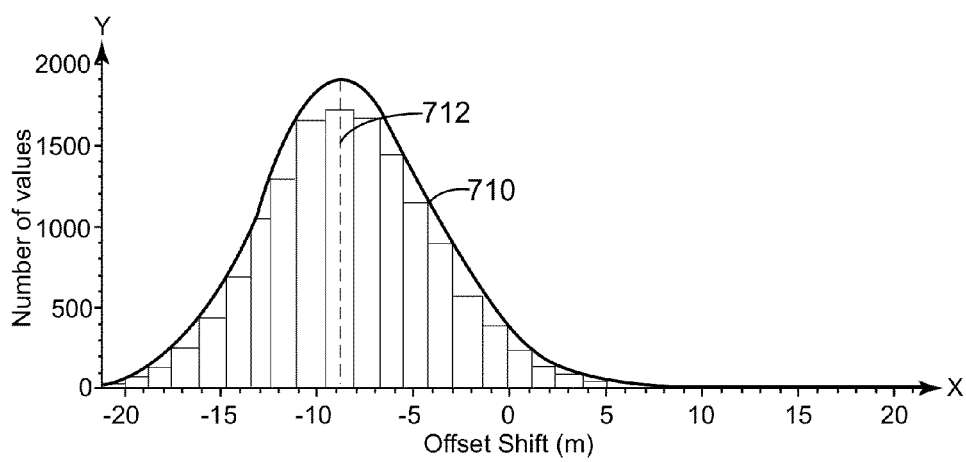

While the operator of the seismic survey may rely only on one CDP as indicated in FIG. 6 for determining the offset shift, it is more accurate to rely on multiple CDP calculations for determining the offset shift. For example, one may take into consideration many CDPs (e.g., thousands of them) and calculate a CDP offset shift for each CDP. These values may then be plotted, as shown in FIGS. 7A and 7B for the examples 300 and 302 of FIG. 3. FIGS. 7A and 7B show the number of samples having a given CDP offset shift on the Y axis and the value of the CDP offset shift is shown on the X axis.

Having the plural CDP offset shifts corresponding to the plural CDPs and using statistical methods, a curve 700 for FIG. 7A and a curve 710 for FIG. 7B may be fitted to the calculated offset shifts. Then, a mean value (702 for FIGS. 7A and 712 for FIG. 7B) is calculated, and this mean value is considered to be the offset shift that needs to be used for the entire recorded data.

The above novel algorithm may be implemented as a method in a computing device to automatically pick traces from the recorded seismic data and evaluate the offset shift. Thus, as the operator of the vessel performs the seismic survey, the computing device may automatically calculate and display (in real time) the offset shift so that the operator may make the appropriate decision. Generally, the seismic traces should be compensated for the motion of the vessel. In marine acquisition, the receivers move during the recording of the each shot, while the measured position of the receivers are recorded at the moment of the shot. However, standard receiver motion correction is based on a time spatial Fourier transformation. This process is time intensive and might not be suitable for real time applications. In real time quality control, the measured offset should be corrected by $v_{boat}t$ before entering into linear regression.

A method for calculating the offset shift is now discussed with regard to FIG. 8. The method includes a step 800 for towing with a vessel a streamer and a seismic source in water. The streamer includes plural receivers, e.g., at least a first receiver and a second receiver. The method further includes a step 802 of actuating the seismic source to generate energy, and a step 804 of recording plural traces with the receivers, wherein the traces represent energy reflected from a subsurface under the water. The method includes a step 806 of selecting two pairs of traces from the plural traces and, for each pair, calculating a quantity Y that depends on measured offsets of receivers for which the traces were selected, and a quantity X that depends on travel-times and the measured offsets of the receivers for which the traces were selected; a step 808 of calculating a linear relation Y=aX+b, where "a" is a constant and "b" is related to the offset shift. With this data, the method estimates in step 810 the offset shift from b to correct the measured offsets.

It is noted that the novel method discussed above may be used as a complement to traditional methods and does not rely on GPS or acoustic devices.

Figure 9:
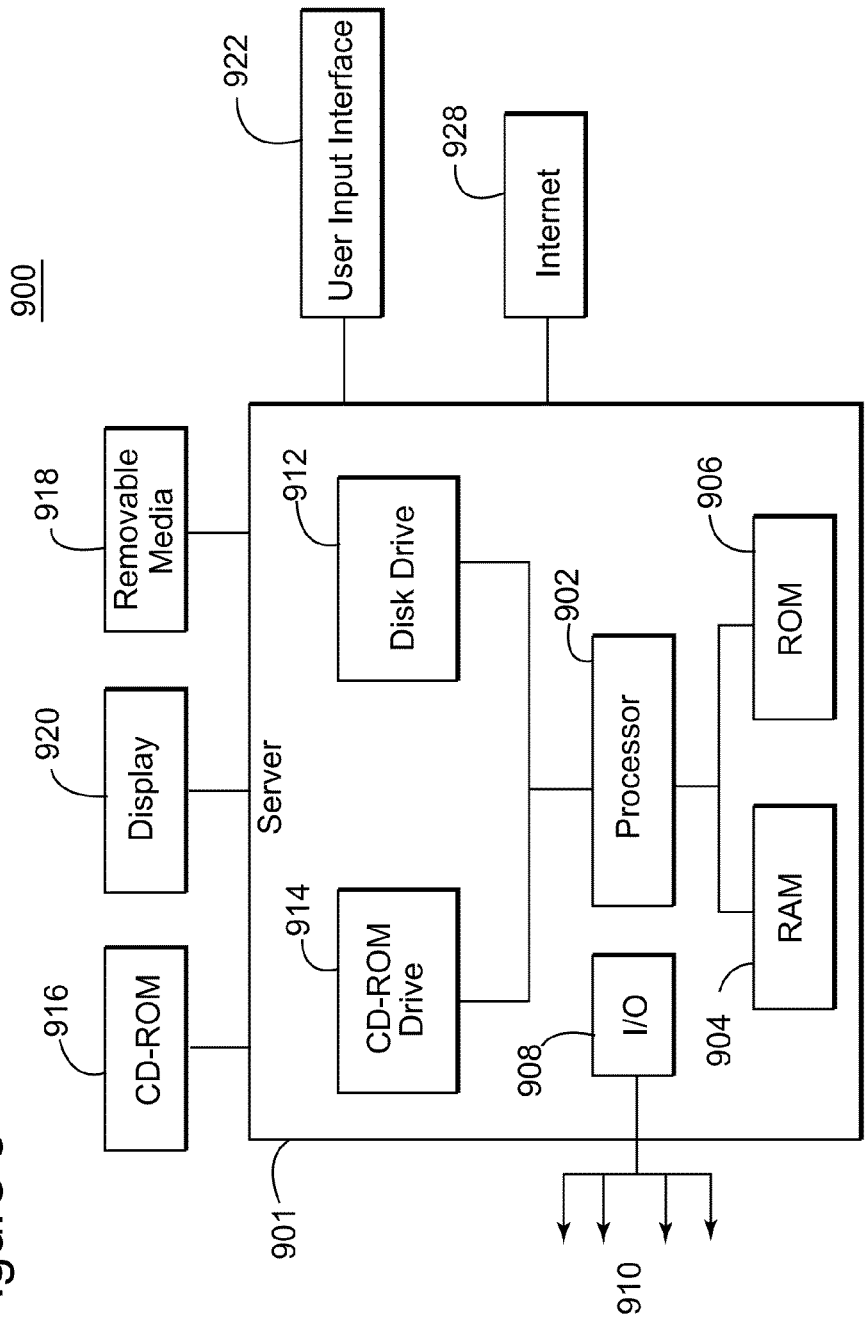
FIG. 9 is a schematic diagram of a computing device for implementing the method illustrated in FIG. 8.

For purposes of illustration and not of limitation, an example of a computing device capable of carrying out operations in accordance with the exemplary embodiments is illustrated in FIG. 9. Hardware, firmware, software or a combination thereof may be used to perform the various steps and operations described herein.

The exemplary computing device 900 suitable for performing the activities described in the exemplary embodiments may include or not a server 901. The infrastructure services discussed above may be implemented in the computing device 900, e.g., as an infrastructure service interface. Thus, the infrastructure service interface may include only software instructions or a combination of software and hardware components. The server 901 may include a central processor (CPU) 902 coupled to a random access memory (RAM) 904 and to a read-only memory (ROM) 906. The ROM 906 may also be other types of storage media to store programs, such as programmable ROM (PROM), erasable PROM (EPROM), etc. The processor 902 may communicate with other internal and external components through input/output (I/O) circuitry 908 and bussing 910, to provide control signals and the like. The processor 902 carries out a variety of functions as are known in the art, as dictated by software and/or firmware instructions.

The server 901 may also include one or more data storage devices, including hard and disk drives 912, DVD/CD-ROM drives 914, and other hardware capable of reading and/or storing information. In one embodiment, software for carrying out the above-discussed steps may be stored and distributed on a DVD/CD-ROM 916, removable media 918 or other form of media capable of portably storing information. These storage media may be inserted into, and read by, devices such as the DVD/CD-ROM drive 914, the disk drive 912, etc. The server 901 may be coupled to a display 920, which may be any type of known display or presentation screen, such as LCD, LED display, plasma display, cathode ray tubes (CRT), etc. A user input interface 922 is provided, including one or more user interface mechanisms such as a mouse, keyboard, microphone, touch pad, touch screen, voice-recognition system, etc.

The server 901 may be coupled to other devices (which themselves may have the structure of the computing device 900), such as landline and/or wireless terminals, via a network. The server may be part of a larger network configuration as in a global area network (GAN) such as the Internet 928, which allows ultimate connection to the various landline and/or mobile client devices.

One or more of the exemplary embodiments discussed above provide a computing device and method for calculating an offset shift for a marine seismic survey. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for calculating an offset shift of measured offsets between a seismic source and plural receivers of a streamer, the method comprising:
towing with a vessel at least the streamer and the seismic source in water, wherein the plural receivers include a first receiver and a second receiver;
actuating the seismic source to generate energy;
recording plural traces with the receivers, wherein the traces represent energy reflected from a subsurface under the water;
selecting two pairs of traces from the plural traces and for each pair, calculating a quantity Y that depends on measured offsets of receivers for which the traces were selected wherein quantity X has units of seconds squared per meter, and a quantity X that depends on travel-times and the measured offsets of the receivers for which the traces were selected;
calculating a linear relation Y=aX+b, where "a" is a constant and "b" is related to the offset shift; and
estimating the offset shift from b to correct the measured offsets.

2. The method of claim 1, further comprising:
calculating the quantity Y, for a first pair of traces corresponding to the first and second receivers, as $x_1+x_2$, where (i) $x_1$ is a measured offset of the first receiver relative to the source and (ii) $x_2$ is a measured offset of the second receiver relative to the source.

3. The method of claim 2, further comprising:
calculating the quantity X, for the first pair of traces, as $$\frac{t_2^2 - t_1^2}{x_2 - x_1},$$

where (i) $t_1$ is a travel-time of a wave traveling from the source to the subsurface and then to the first receiver relative, and (ii) $t_2$ is a travel-time of a wave traveling from the source to the subsurface and then to the second receiver.

4. The method of claim 3, wherein the constant a is given by $(v_0/\cos\theta)^2$, where $v_0$ is a speed of the wave underwater and $\theta$ is dip angle of a water bottom relative to a plane parallel with a surface of the water.

5. The method of claim 1, further comprising:
applying a linear regression algorithm to the Y and X values for determining the value of b.

6. The method of claim 1, further comprising:
calculating, for plural common depth points (CDPs), corresponding CDP offset shifts, wherein a common depth point is defined as a point located at a midpoint along a line between the source and a receiver.

7. The method of claim 6, further comprising:
statistically determining the offset shift based on the CDP offset shifts.

8. The method of claim 6, further comprising:
statistically determining the offset shift as a mean value of the CDP offset shifts.

9. The method of claim 1, wherein a pair of traces is selected so that a distance between the two receivers corresponding to the pair of traces is at least one kilometer.

10. The method of claim 1, further comprising:
calculating the travel-times based on first arrivals of each trace.

11. A method for generating an image of a subsurface that calculates an offset shift of measured offsets between a seismic source and plural receivers of a streamer, the method comprising:

receiving seismic data recorded underwater by the plural receivers;

selecting two pairs of traces from the plural traces and for each pair, calculating a quantity Y that depends on measured offsets of receivers for which the traces were selected, and a quantity X that depends on travel-times and the measured offsets of the receivers for which the traces were selected wherein quantity X has units of seconds squared per meter;

calculating a linear relation Y=aX+b, where "a" is a constant and "b" is related to the offset shift;

estimating the offset shift from "b";

correcting the measured offsets of the receivers based on the offset shift; and calculating the image of the subsurface based on the corrected offsets.

12. A computing device for calculating an offset shift of measured offsets between a seismic source and plural receivers of a streamer, the computing device comprising:

an interface configured to receive plural traces recorded by the receivers, wherein the traces represent energy reflected from a subsurface under the water; and a processor connected to the interface and configured to, select two pairs of traces from the plural traces and for each pair, calculate a quantity Y that depends on measured offsets of receivers for which the traces were selected, and a quantity X that depends on travel-times and the measured offsets of the receivers for which the traces were selected, calculate a linear relation Y=aX+b, where "a" is a constant and "b" is related to the offset shift, and estimate the offset shift from b to correct the measured offsets.

13. The computing device of claim 12, wherein the processor is further configured to:

calculate the quantity Y, for a first pair of traces corresponding to the first and second receivers, as $x_1+x_2$, where (i) $x_1$ is a measured offset of the first receiver relative to the source and (ii) $x_2$ is a measured offset of the second receiver relative to the source.

14. The computing device of claim 13, wherein the processor is further configured to:

calculate the quantity X, for the first pair of traces, as $$\frac{t_2^2 - t_1^2}{x_2 - x_1},$$

where (i) $t_1$ is a travel-time of a wave traveling from the source to the subsurface and then to the first receiver relative, and (ii) $t_2$ is a travel-time of a wave traveling from the source to the subsurface and then to the second receiver.

15. The computing device of claim 14, wherein the constant a is given by $(v_0/\cos\theta)^2$, where $v_0$ is a speed of the wave underwater and $\theta$ is dip angle of a water bottom relative to a plane parallel with a surface of the water.

16. The computing device of claim 12, wherein the processor is further configured to:

calculate, for plural common depth points (CDPs), corresponding CDP offset shifts, wherein a common depth point is defined as a point located at a midpoint along a line between the source and a receiver.

17. The computing device of claim 16, wherein the processor is further configured to:

statistically determine the offset shift based on the CDP offset shifts.

18. The computing device of claim 16, wherein the processor is further configured to:

statistically determine the offset shift as a mean value of the CDP offset shifts.

19. The computing device of claim 12, wherein a pair of traces is selected so that a distance between the two receivers corresponding to the pair of traces is at least one kilometer.

20. A non-transitory computer medium for storing instructions for generating an image of a subsurface based on a calculated offset shift of measured offsets between a seismic source and plural receivers of a streamer, the instructions comprising:

receiving seismic data recorded underwater by the plural receivers;

selecting two pairs of traces from the plural traces and for each pair, calculating a quantity Y that depends on measured offsets of receivers for which the traces were selected, and a quantity X that depends on travel-times and the measured offsets of the receivers for which the traces were selected wherein quantity X has units of seconds squared per meter;

calculating a linear relation Y=a related to the offset shift; X+b, where "a" is a constant and "b" is estimating the offset shift from "b";

correcting the measured offsets of the receivers based on the offset shift; and calculating the image of the subsurface based on the corrected offsets.

* * * * *

UNITED STATES PATENT AND TRADEMARK OFFICE
CERTIFICATE OF CORRECTION

PATENT NO. : 8,964,505 B2  
APPLICATION NO. : 13/493378  
DATED : February 24, 2015  
INVENTOR(S) : Yu Page 1 of 1

It is certified that error appears in the above-identified patent and that said Letters Patent is hereby corrected as shown below:

In the specification

In Column 6, Line 18, delete "FIGS." and insert -- FIG. --, therefor.

In the claims

In Column 8, Lines 16-17, in Claim 1, delete "wherein quantity X has units of seconds squared per meter," and insert the same at line 19 after "selected;" as a continuation sub-point.

In Column 10, Lines 45-46, in Claim 20, delete "Y=a related to the offset shift; X+b, where "a" is a constant and "b" is" and insert -- Y=aX+b, where "a is a constant and "b" is related to the offset shift; --, therefor.

Signed and Sealed this  
Twelfth Day of July, 2016

Michelle K. Lee  
*Director of the United States Patent and Trademark Office*